(12) United States Patent
Zeldin et al.

(10) Patent No.: US 10,325,115 B1
(45) Date of Patent: *Jun. 18, 2019

(54) INFRASTRUCTURE TRUST INDEX

(71) Applicant: EMC Corporation, Hopkinton, MA (US)

(72) Inventors: Marina Zeldin, Ottawa (CA); Stephen Todd, Shrewsbury, MA (US); Nikhil Sharma, El Dorado Hills, CA (US); Said Tabet, Natick, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 230 days.

This patent is subject to a terminal disclaimer.

(21) Appl. No.: 14/744,886

(22) Filed: Jun. 19, 2015

Related U.S. Application Data

(63) Continuation-in-part of application No. 14/610,191, filed on Jan. 30, 2015, now Pat. No. 9,594,546.

(51) Int. Cl.
*G06F 16/22* (2019.01)
*G06F 21/62* (2013.01)

(52) U.S. Cl.
CPC ...... *G06F 21/6281* (2013.01); *G06F 16/2264* (2019.01); *G06F 2221/032* (2013.01)

(58) Field of Classification Search
CPC .......... G06F 21/51; G06F 21/55; G06F 21/629
See application file for complete search history.

(56) References Cited

U.S. PATENT DOCUMENTS

| | | | |
|---|---|---|---|
| 7,343,601 B2 | 3/2008 | Azagury et al. | |
| 7,752,437 B1 | 7/2010 | Thakur et al. | |
| 8,010,426 B2 | 8/2011 | Kopp et al. | |
| 8,671,449 B1 | 3/2014 | Nachenberg | |
| 8,706,692 B1 | 4/2014 | Luthra et al. | |
| 8,756,656 B1 | 6/2014 | Hartmann | |
| 8,893,293 B1 * | 11/2014 | Schmoyer | H04L 63/0807 726/26 |
| 8,904,299 B1 | 12/2014 | Owen et al. | |
| 8,972,564 B1 | 3/2015 | Allen | |
| 9,256,656 B2 | 2/2016 | Fankhauser et al. | |
| 9,727,591 B1 * | 8/2017 | Sharma | G06F 16/215 |
| 9,805,213 B1 * | 10/2017 | Kragh | G06F 16/245 |
| 2003/0055898 A1 * | 3/2003 | Yeager | G06F 9/544 709/205 |
| 2004/0243692 A1 | 12/2004 | Arnold et al. | |

(Continued)

OTHER PUBLICATIONS

"BroadBand properties";"Cloud Computing and Sustainability";"2011";"6 pages" (Year: 2011).*

(Continued)

*Primary Examiner* — Wei Y Zhen
*Assistant Examiner* — Brahim Bourzik
(74) *Attorney, Agent, or Firm* — Ryan, Mason & Lewis, LLP

(57) ABSTRACT

A value is obtained from a set of values respectively assigned to a set of characteristics of a first control associated with at least one trust dimension attributable to a given infrastructure, wherein the given infrastructure comprises one or more elements. An infrastructure trust index is computed based at least on the obtained value, wherein the infrastructure trust index characterizes a trustworthiness attributable to the given infrastructure.

20 Claims, 8 Drawing Sheets

| TRUST DIMENSION | DOMAIN | CONTROL ID | DESCRIPTION | CHARACTERISTIC | VALUE |
|---|---|---|---|---|---|
| SECURITY | ENCRYPTION | DAREKS | DATA AT REST ENCRYPTION KEY SIZE | 256 BITS | 1 |
| | | | | 512 BITS | 2 |
| | | | | 1024 BITS | 3 |
| | | | | 2048 BITS | 4 |
| | | CHANNEL KS | NETWORK PROTOCOL TRAFFIC ENCRYPTION KEY SIZE | 112 | 1 |
| | | | | 128 | 2 |
| | | | | 192 | 3 |
| | | | | 256 | 4 |

410

(56) References Cited

U.S. PATENT DOCUMENTS

| | | | |
|---|---|---|---|
| 2005/0033980 A1* | 2/2005 | Willman | G06F 21/57 726/26 |
| 2005/0108703 A1 | 5/2005 | Hellier | |
| 2006/0155738 A1* | 7/2006 | Baldwin | G06Q 10/00 |
| 2006/0161444 A1* | 7/2006 | Lubrecht | G06F 8/00 705/7.41 |
| 2008/0083031 A1* | 4/2008 | Meijer | G06F 21/629 726/22 |
| 2008/0091747 A1 | 4/2008 | Prahlad et al. | |
| 2008/0104060 A1 | 5/2008 | Abhyankar et al. | |
| 2008/0107037 A1 | 5/2008 | Forbes et al. | |
| 2008/0134332 A1 | 6/2008 | Keane et al. | |
| 2010/0058054 A1* | 3/2010 | Irvine | H04L 63/0407 713/165 |
| 2010/0076987 A1 | 3/2010 | Schreiner | |
| 2010/0106558 A1 | 4/2010 | Li et al. | |
| 2010/0250867 A1 | 9/2010 | Bettger et al. | |
| 2010/0332530 A1 | 12/2010 | McKelvie et al. | |
| 2011/0047056 A1 | 2/2011 | Overman et al. | |
| 2011/0153727 A1 | 6/2011 | Li | |
| 2011/0179110 A1 | 7/2011 | Soloway | |
| 2011/0191562 A1 | 8/2011 | Chou et al. | |
| 2011/0225276 A1* | 9/2011 | Hamilton, II | G06F 9/5027 709/223 |
| 2011/0231899 A1 | 9/2011 | Pulier et al. | |
| 2011/0246653 A1* | 10/2011 | Balasubramanian | G06F 17/5045 709/226 |
| 2012/0066487 A1* | 3/2012 | Brown | G06F 9/5083 713/150 |
| 2012/0254115 A1 | 10/2012 | Varadharajan | |
| 2012/0284713 A1* | 11/2012 | Ostermeyer | G06F 17/5009 718/1 |
| 2013/0305376 A1* | 11/2013 | Chauhan | G06F 21/577 726/25 |
| 2014/0019423 A1 | 1/2014 | Liensberger et al. | |
| 2015/0127660 A1 | 5/2015 | Zilberberg et al. | |
| 2015/0220649 A1 | 8/2015 | Papa et al. | |
| 2015/0286697 A1 | 10/2015 | Byrne et al. | |
| 2015/0373049 A1* | 12/2015 | Sharma | H04L 63/126 726/22 |
| 2015/0378788 A1 | 12/2015 | Roese et al. | |
| 2016/0267082 A1 | 9/2016 | Wong et al. | |
| 2016/0371396 A1* | 12/2016 | Todd | G06F 16/219 |

OTHER PUBLICATIONS

P. Banerjee et al., "The Future of Cloud Computing: An HP Labs Perspective," HP Labs Technical Reports, Dec. 2010, 11 pages.

C. Dai et al., "An Approach to Evaluate Data Trustworthiness Based on Data Provenance," Proceedings of the 5th VLDB Workshop on Secure Data Management (SDM '08), Aug. 2008, pp. 82-98.

P. De Leusse et al., "Toward Governance of Cross-Cloud Application Deployment," Second Optimising Cloud Services Workshop, Mar. 2012, 12 pages.

A. Gehani et al., "Mendel: Efficiently Verifying the Lineage of Data Modified in Multiple Trust Domains," Proceedings of the 19th ACM International Symposium on High Performance Distributed Computing (HPDC '10), Jun. 2010, 13 pages.

M.T. Jones, "Anatomy of a Cloud Storage Infrastructure," http://www.ibm.com/developerworks/cloud/library/cl-cloudstorage, Nov. 2010, 7 pages.

P. Mell et al., "The NIST Definition of Cloud Computing," U.S. Department of Commerce, Computer Security Division, National Institute of Standards and Technology, Special Publication 800-145, Sep. 2011, 7 pages.

S. Pearson, "Privacy, Security and Trust in Cloud Computing," HP Labs Technical Reports, Jun. 2012, pp. 1-57.

U.S. Appl. No. 14/610,191 filed in the name of Stephen Todd et al. Jan. 30, 2015 and entitled "Governed Application Deployment on Trusted Infrastructure."

U.S. Appl. No. 14/674,121 filed in the name of Stephen Todd et al. Mar. 31, 2015 and entitled "Lineage-Based Veracity for Data Repositories."

U.S. Appl. No. 14/674,218 filed in the name of Nikhil Sharma et al. Mar. 31, 2015 and entitled "Use of Trust Characteristics of Storage Infrastructure in Data Repositories."

EMC, "EMC Centera Content—Addressable Storage—Archiving Made Simple, Affordable and Secure," http://www.emc.com/collateral/hardware/data-sheet/c931-emc-centera-cas-ds.pdf,. May 2013, 4 pages.

* cited by examiner

| TRUST DIMENSION | DOMAIN | CONTROL ID | DESCRIPTION | CHARACTERISTIC | VALUE |
|---|---|---|---|---|---|
| SECURITY | ENCRYPTION | DAREKS | DATA AT REST ENCRYPTION KEY SIZE | 256 BITS | 1 |
| | | | | 512 BITS | 2 |
| | | | | 1024 BITS | 3 |
| | | | | 2048 BITS | 4 |
| | | CHANNEL KS | NETWORK PROTOCOL TRAFFIC ENCRYPTION KEY SIZE | 112 | 1 |
| | | | | 128 | 2 |
| | | | | 192 | 3 |
| | | | | 256 | 4 |

| CONTROL | WEIGHT |
|---|---|
| DAREKS | 10 |
| CHANNEL KS | 1 |

FIG. 5A

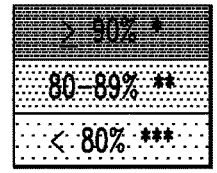

| SCOPE | DIMENSION | ITI METRIC | COMPLIANCE |
|---|---|---|---|
| COMPANY | ALL | % COMPLIANCE TO ITI | 90% * |
|  | SECURITY | % COMPLIANCE TO ITI | 92% * |
|  | AVAIL & REC | % COMPLIANCE TO ITI | 88% ** |

510

LIST NON COMPLIANT INFRASTRUCTURES

| INFRASTR. ID | DOMAIN | CONTROL ID | ITI REQD. | ITI VALUE |
|---|---|---|---|---|
| STORAGE 0010 | DATA AVAIL | TOTAL AVAL | 10 | 8 ** |
| STORAGE 0012 | BIZ CONTINUITY | RPO | 10 | 8 ** |

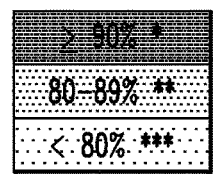

| SCOPE | DIMENSION | ITI METRIC | COMPLIANCE |
|---|---|---|---|
| COMPANY | ALL | % COMPLIANCE TO ITI | 90% * |
|  | PRIVATE CLOUD | % COMPLIANCE TO ITI | 92% * |
|  | PUBLIC CLOUD | % COMPLIANCE TO ITI | 88% ** |
|  | HYBRID CLOUD | % COMPLIANCE TO ITI | 90% * |

530

INFRASTRUCTURE TRUST INDEX

CROSS REFERENCE TO RELATED APPLICATION

The present application is a continuation-in-part of U.S. patent application identified as Ser. No. 14/610,191 filed on Jan. 30, 2015 and entitled "GOVERNED APPLICATION DEPLOYMENT ON TRUSTED INFRASTRUCTURE," the disclosure of which is incorporated by reference herein in its entirety.

FIELD

The field relates generally to computing environments, and more particularly to assessing characteristics of infrastructure of such computing environments.

BACKGROUND

One of the roles of a chief data officer (CDO) in an enterprise (e.g., corporation, business, venture, etc.) is to monitor the value of enterprise data sets. As the value and/or criticality of a data set rises or falls, the CDO must work closely with the chief information officer (CIO)/chief information security officer (CISO) to ensure that the data set is stored on an infrastructure with the correct level of data protection in relation to its value.

Indeed, some data sets have become so critical that data insurance policies are being taken out against the data. In this use case, an insurer will often specify a minimum level of data protection with which the data set must be stored in order to contractually satisfy an insurance payout in the case of breach, theft, corruption and/or loss.

SUMMARY

Embodiments of the invention provide techniques for assessing trust characteristics of infrastructure of computing environments.

For example, in one embodiment, a method comprises the following steps. A value is obtained from a set of values respectively assigned to a set of characteristics of a first control associated with at least one trust dimension attributable to a given infrastructure, wherein the given infrastructure comprises one or more elements. An infrastructure trust index is computed based at least on the obtained value, wherein the infrastructure trust index characterizes a trustworthiness attributable to the given infrastructure.

Advantageously, the computed infrastructure trust index can be used for one or more of: a policy-compliance audit, a policy non-compliance notification, a data set migration decision, an application placement decision, data set value monitoring, etc.

These and other features and advantages of the invention will become more readily apparent from the accompanying drawings and the following detailed description.

BRIEF DESCRIPTION OF THE DRAWINGS

FIGS. 4A and 4B illustrate an example of controls and values and an infrastructure trust index policy, according to an embodiment of the invention.

FIGS. 5A and 5B illustrate infrastructure trust index dashboards, according to embodiments of the invention.

DETAILED DESCRIPTION

Figure 1:
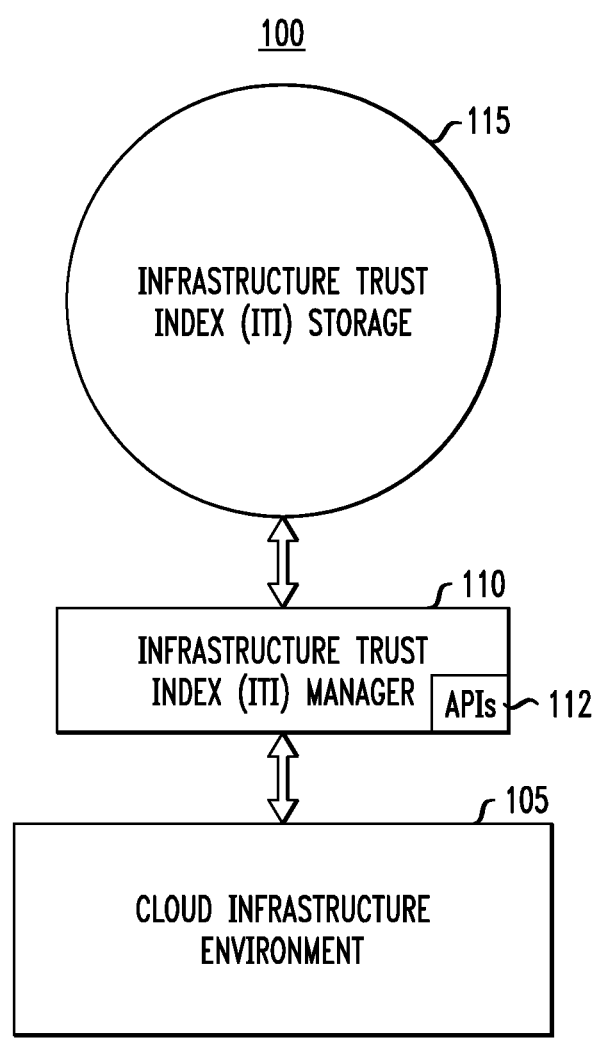
FIG. 1 illustrates an infrastructure trust index manager and cloud infrastructure environment, according to an embodiment of the invention.

Illustrative embodiments may be described herein with reference to exemplary cloud infrastructure, data repositories, data centers, data processing systems, computing systems, data storage systems and associated servers, computers, storage units, storage arrays, and devices such as processing devices. It is to be appreciated, however, that embodiments of the invention are not restricted to use with the particular illustrative system and device configurations shown. Moreover, the phrases "cloud infrastructure," "data repository," "data center," "data processing system," "computing system," "data storage system," and the like as used herein are intended to be broadly construed, so as to encompass, for example, private, public or hybrid (part private and part public) cloud computing or storage systems, as well as other types of systems comprising distributed virtual infrastructure. However, a given embodiment may more generally comprise any arrangement of one or more processing devices.

As used herein, the following terms and phrases have the following illustrative meanings: "application" refers to one or more software programs designed to perform one or more functions; "infrastructure" refers to physical and/or virtual resources that make up and/or support an overall information technology environment including, but not limited to, computing, storage, and/or network components (elements); "metadata" refers to data that describes or defines other data; and "trusted" refers to at least one of: satisfying (or at least substantially satisfying) or being consistent with one or more trust-based criteria, e.g., policies, requirements, regulations, etc.; possessing one or more trust attributes such as, e.g., retention-capable, encryption, immutability, etc., in the case of data; and possessing one or more trust dimensions such as, e.g., availability, recovery, security, etc., in the case of infrastructure. An example of metadata representing trust that is generated and used in accordance with embodiments of the invention includes an infrastructure trust index (ITI), as will be explained in detail herein. The ITI may also be referred to herein as an ITI metric, ITI score, ITI value, or the like. Other examples of metadata may include, but are not limited to, trust metrics, veracity scores, trust attributes, and/or associations between trust characteristics and data entities.

It is realized herein that existing information technology personnel and systems struggle with ways to assess the trust posture of infrastructure associated with a computing system, particularly in order to appropriately place data and applications on the computing system. Embodiments of the invention define an infrastructure trust index, or ITI, which comprises a quantitative methodology to assess the trust characteristic(s) of the infrastructure. Among other advantages, ITI enables automated trust assessment, hence leading to improved and/or optimized data/application placement and fewer compliance discrepancies.

As will be explained in illustrative embodiments herein, an ITI is a value that measures the trust capabilities of at least a subset of the totality of an enterprise infrastructure. The ITI could represent the overall infrastructure or select portions of the infrastructure. As customer data sets begin to spread from private to hybrid to public cloud, there is great benefit in the continual monitoring of ITI in a variety of scenarios including, but not limited to: the ITI of infrastructure storing any individual data set; the overall ITI of infrastructure storing individual data sets in an exclusively private fashion; the ITI of infrastructure storing individual data sets in an exclusively public fashion; the ITI of infrastructure storing individual data sets in hybrid (private/public) configurations; and the ITI of the private cloud infrastructure.

It is realized herein that disk arrays have the ability to report detailed performance metrics of performance tiers within the array. There are a variety of performance tools that can gather this data and then place workloads appropriately (e.g., platinum/gold/silver/bronze). Thus, while there are a variety of characteristics that can be gathered from an infrastructure, there is no existing solution that implements a common trust taxonomy that has corresponding numerical metrics associated therewith. ITI provides such metrics (e.g., array A supports retention, but array B supports basic retention and event-based retention, which results in a higher trust index for that particular area of taxonomy).

Without the ability to query an overall trust metric of a given infrastructure, there is no ability to calculate any trust metric for a specific data set. Assuming that a given data set is stored in a private cloud environment, there is therefore no existing way to query the specific subset of that infrastructure which hosts the data set. This is especially true for data sets: that span tiers within an array (e.g., Fully Automated Storage Tiering or FAST distributes data across flash, Fibre Channel (FC), and Serial Attached SCSI (SAS)); for which snapshot copies are created on other disks within the array; for which disaster copies are distributed in remote arrays; and/or which participate in a variety of data protection techniques (e.g., Networker, Avamar, DataDomain) that likewise make/keep copies in different locations.

It is also realized herein that a trust metric of an infrastructure storing a data set may vary as a result of, for example, failures such as failed drives, broken replication links, etc. For the data insurance use case, a continual monitoring and recalculation of a trust metric computed according to embodiments of the invention will be a key proof point in contractually proving the existence of contractually correct/incorrect data protection levels.

As such a trust metric of an infrastructure storing a data set rises or falls, there is no existing mechanism to: (a) notify; or (b) auto-correct. Data insurance auditors, for example, may impose time constraints for max-time-to-fix before considering the insured as negligent in the repair of the problem. This would be a way for the insurer to contractually avoid the insurance payout.

Similarly, if the trust metric of an infrastructure storing a data set rises too high in accordance with the perceived value of the data set (e.g., increase in the number of snapshot copies from four to eight), the user (e.g., corporation contracting with an infrastructure provider) may be overpaying for infrastructure and would have knowledge (and therefore recourse) to correct the excessive use of computing resources.

For those scenarios where the perceived data value of a given data set requires a minimum and/or maximum trust metric from the underlying infrastructure, there is no existing dashboard that can display, for each such data set, a red/yellow/green style indicator legend for a real-time indication of current compliance. Likewise, there is no existing capability to trace the compliance of a given data set over time. Still further, there is also no existing capability to look at an overall data center infrastructure (private or public) and calculate a raw trust metric (e.g., unassociated with data sets).

Furthermore, there is no existing way to calculate a trust metric of cloud models, such as for a hybrid cloud, a private cloud, and/or a public cloud. Without such calculation, there is no existing way to assess the trust posture of the infrastructure in those models for provisioning decisions.

For data sets that span private and public boundaries (e.g., a VMAX data set that uses TwinStrata on the back end to tier cold data to a public cloud provider), there is no existing trust metric that can combine: (a) the trust metric of the private portion; (b) the trust metric of the pipe connecting the private and public portions; and (c) the trust metric of the public portion.

There is currently a European Union (EU) funded research initiative (SPECS) that is looking at public cloud security service level agreements (SLAs). However, such initiative does not currently reach down to an infrastructure trust metric level. There is also no way for an enterprise to calculate a trust metric based on whether or not their publicly-stored data set is protected by a cloud-to-cloud technology such as Spanning.

Infrastructure in its raw state can be configured to report trust characteristics. An enterprise, however, may wish to weigh this information against the knowledge that data sets stored 100% in-house should be associated with a higher-weighted trust metric than those that are part-hybrid and/or all-public. There are no existing solutions that enable this consideration.

There is also no existing way for a customer to query its data audit and inventory system (e.g., a metadata lake that contains all of the mappings of data sets to trusted infrastructure) to determine what percentage of data sets exist privately, publicly, or in a hybrid fashion.

In addition to not being able to report on the percentage, there is no existing way to provide an aggregate trust metric for all data sets stored private, publicly, or in a hybrid fashion.

As customers consider the migration of their data set, whether it be for technology refresh or deciding to move data to a hybrid or public state, there is no existing mechanism to simulate a trust metric to determine whether or not the migration would violate contractual or policy thresholds, including the trust metric that would be experienced during the movement of the data (e.g. would it be encrypted or not).

As customers perform the migration of their data sets, there is no existing way to audit a changing trust metric during the migration in the case that data is stolen, corrupted, or lost as part of the migration.

Illustrative embodiments of the invention provide such a trust metric in the form of an infrastructure trust index (ITI), as will be explained in further detail below, which overcome these and other drawbacks of existing methodologies and systems.

FIG. 1 illustrates an infrastructure trust index (ITI) manager and cloud infrastructure environment in which trust metric management techniques as described herein are implemented, according to an embodiment of the invention. As shown in system 100, a cloud infrastructure environment 105 is operatively coupled to an ITI manager 110, which is coupled to an ITI storage repository 115. The storage repository 115 may be part of a data lake and/or a metadata lake.

It is to be appreciated that the phrase "cloud infrastructure environment" as illustratively used herein generally refers to an environment that comprises computing and storage resources and applications that are hosted thereon. The cloud infrastructure in one illustrative embodiment comprises an infrastructure-as-a-service (IaaS) approach with a plurality of clouds that form a plurality of data centers (e.g., software defined data centers or SDDCs). Storage infrastructures that store data that is monitored by the ITI manager 110 are considered part of cloud infrastructure environment 105. Likewise, the storage infrastructure that hosts the ITI storage repository 115 can be part of the cloud infrastructure in environment 105 as well.

The ITI manager 110, as will be further described herein, extracts (active mode) and/or receives (passive mode) metadata and measures the trust capabilities of an infrastructure by computing an ITI, and monitors any changes to the ITI such that this trust metric can be associated with data sets that are stored on trusted infrastructure. The ITI manager 110 also comprises one or more application programming interfaces (APIs) 112 through which ITI values can be queried, as will be further explained below.

It is to be appreciated that the ITI manager 110 can be implemented as part of the infrastructure being assessed for its trust characteristics. That is, each element in the infrastructure, and/or sets of elements in the infrastructure, can implement the ITI manager functionality and thus compute and report their ITI (e.g., dynamically so that periodic trust-related changes are monitored and reported as well). Alternatively, the ITI manager 110 can be implemented as a stand-alone component that receives trust-related data from individual elements, and/or sets of elements, of the subject infrastructure that is then used by the ITI manager to compute the ITI. Furthermore, in other embodiments, the functionality of the ITI manager may be distributed between a combination of one or more infrastructure elements and a stand-alone component. Embodiments of the invention are not limited to where in the system the ITI functionality is implemented.

Figure 2:
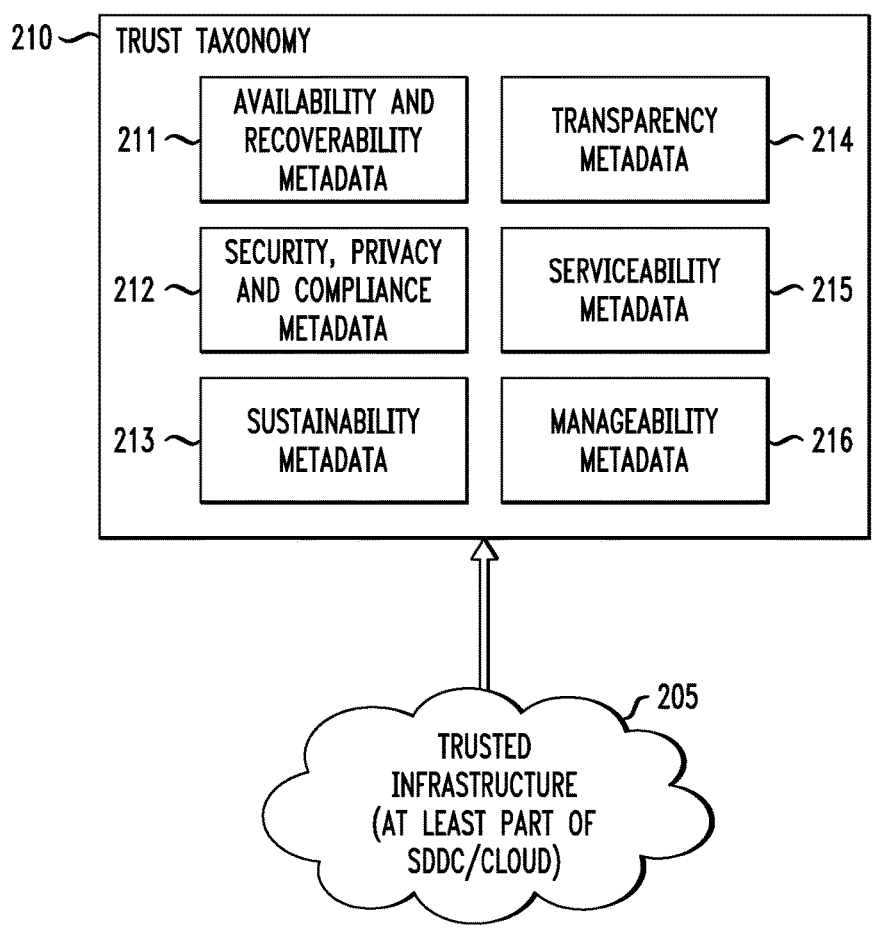
FIG. 2 illustrates a trust taxonomy associated with trusted infrastructure, according to an embodiment of the invention.

Furthermore, the ITI manager 110 may recognize one or more given trust taxonomies. An exemplary trust taxonomy is described in the U.S. patent application identified as U.S. Ser. No. 14/610,191 filed on Jan. 30, 2015 and entitled "GOVERNED APPLICATION DEPLOYMENT ON TRUSTED INFRASTRUCTURE," the disclosure of which is incorporated by reference herein in its entirety. FIG. 2 herein illustrates an example of such a trust taxonomy. More particularly, trusted infrastructure 205 is configured to supply metadata describing its trust capabilities (characteristics). These trust capabilities, in this embodiment, comprise: (i) availability and recoverability; (ii) security, privacy and compliance; (iii) sustainability; (iv) transparency, (v) serviceability, and (vi) manageability, as will be further explained. Thus, as shown in trust taxonomy 210, these capabilities are expressed as: availability and recoverability metadata 211; security, privacy and compliance metadata 212; sustainability metadata 213; transparency metadata 214; serviceability metadata 215; and manageability metadata 216.

More specifically, availability and recoverability metadata 211 comprises statistics or other metrics that describe and/or quantify the infrastructure's ability to perform its agreed upon function(s) when required, as well as its ability to recover from failure(s). Security, privacy and compliance metadata 212 comprises statistics or other metrics that describe and/or quantify the infrastructure's ability to ensure confidentiality, integrity and compliance of data and infrastructure. Sustainability metadata 213 comprises statistics or other metrics that describe and/or quantify the infrastructure's ability to enable increased power and/or energy efficiencies and ensure ethical practices. Transparency metadata 214 comprises statistics or other metrics that describe and/or quantify the infrastructure's ability to provide standardized access to customer operational reports and reporting against trust objectives. Serviceability metadata 215 comprises statistics or other metrics that describe and/or quantify the infrastructure's ability to facilitate technical support and problem resolution. Manageability metadata 216 comprises statistics or other metrics that describe and/or quantify the infrastructure's ability to enable automation and interoperability in managing trust-based criteria.

Again, the metadata shown in taxonomy 210 can be extracted from a storage infrastructure by ITI manager 110 in FIG. 1 (active mode) or infrastructure can be configured to declare these trust characteristics to ITI manager 110 (passive mode).

Figure 3:
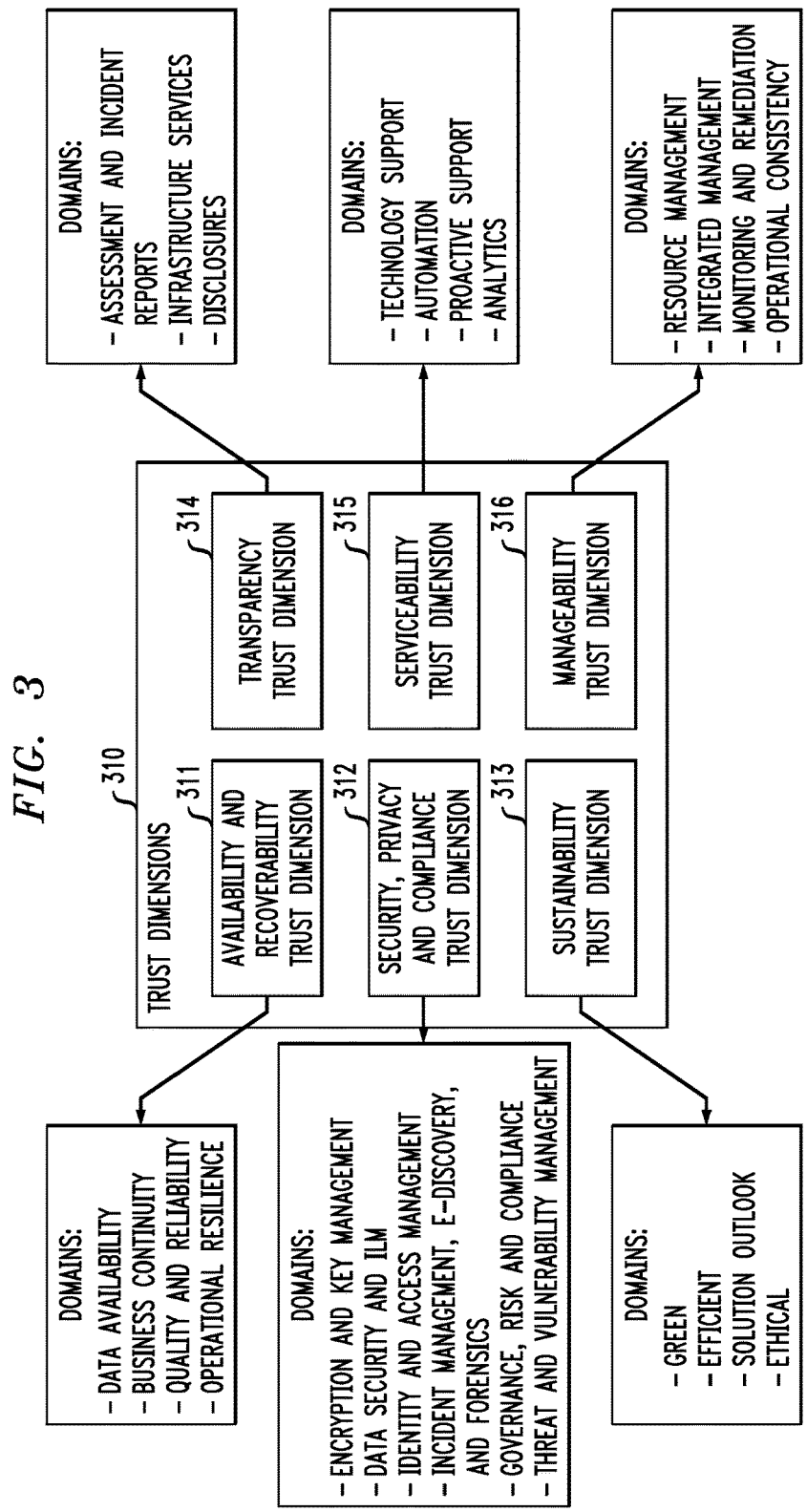
FIG. 3 illustrates trust dimensions and respective domains with which an infrastructure trust index can be computed, according to an embodiment of the invention.

FIG. 3 illustrates further details of the trust taxonomy illustrated in FIG. 2. More particularly, FIG. 3 shows trust dimensions 311 through 316 and respective domains (corresponding to trust taxonomy 210 metadata types 211 through 216, respectively) with which an infrastructure trust index can be computed, according to an embodiment of the invention. As shown, each trust dimension further contains domains: availability and recoverability trust dimension 311 has domains including, but not limited to, data availability, business continuity, quality and reliability, and operational resilience; security, privacy and compliance trust dimension 312 has domains including, but not limited to, encryption and key management, data security and information lifecycle management (ILM), identity and access management, incident management, e-discovery and forensics, governance, risk and compliance (GRC), and threat and vulnerability management; sustainability trust dimension 313 has domains including, but not limited to, green (environmentally-responsible), efficient, solution outlook, and ethical; transparency trust dimension 314 has domains including, but not limited to, assessment and incident reports, infrastructure services, and disclosures; serviceability trust dimension 315 has domains including, but not limited to, technology support, automation, proactive support, and analytics; and manageability trust dimension 316 has domains including, but not limited to, resource management, integrated management, monitoring and remediation, and operational consistency.

FIGS. 4A and 4B illustrate an example of controls and values and an infrastructure trust index policy, according to an embodiment of the invention. In particular, FIGS. 4A and 4B are directed to the specific domain of encryption and key management associated with the security, privacy and compliance trust dimension 312 of FIG. 3.

In this example, controls and values for this particular encryption and key management domain are defined, which are used to calculate the ITI. More specifically, as shown in table 410 in FIG. 4A, two separate controls (control identifiers or ids) are represented, i.e., data at rest (inactive data) encryption key size (DAREKS) and network protocol traffic encryption key size (Channel KS). As can be seen, each control has numeric values associated with the available characteristics of the control. For example, a 256-bit DAREKS is assigned a numeric value of 1, a 512-bit DAREKS is assigned a numeric value of 2, a 1024-bit DAREKS is assigned a numeric value of 3, and a 2048-bit DAREKS is assigned a numeric value of 4. Further, by way of example, a 112-bit Channel KS is assigned a numeric value of 1, a 128-bit Channel KS is assigned a numeric value of 2, a 192-bit Channel KS is assigned a numeric value of 3, and a 256-bit Channel KS is assigned a numeric value of 4. These numeric values, as will be explained below, are aggregated to calculate the ITI of the subject infrastructure.

Different policies can be described on the controls to assess the ITI. Certain controls can be given higher weight, depending on the needs of an organization. In the above example, an organization may find data encryption at rest (DAREKS control) to be more critical and hence assign a higher weight over other controls (Channel KS). The control requirements can also be expressed by assigning appropriate weights to corresponding controls, e.g., as shown in table 420 of FIG. 4B. In FIG. 4B, the DAREKS control is given a higher weight, i.e., 10, than the Channel KS control, i.e., 1. This table on weights is used to formulate the ITI policy. Assume that user requirements for a particular infrastructure are a 256-bit DAREKS and a 112-bit Channel KS. The aggregate ITI score for this policy according to such user requirements and controls as defined in tables 410 and 420 is computed as 10*DAREKS+1*Channel KS=10*1+1*1=11. Storage software can ensure that only those infrastructure components with an ITI at or above 11 are used to store this data set.

It is to be appreciated that tables similar to tables 410 and 420 are created for each trust dimension and its corresponding domains (311 through 316 in FIG. 3) such that values are assigned to the available characteristics of the controls associated with each trust dimension, and weights assigned to each control. The ITI manager 110 accesses these tables in order to calculate the ITI (e.g., 10*DAREKS+1*Channel KS=10*1+1*1=11) for a subject infrastructure. In addition to specific ITIs for a given trust dimension or subset of domain controls, an overall ITI can be computed that aggregates the ITI values computed for each trust dimension being considered.

Embodiments of the invention provide one or more application programming interfaces (APIs) 112 through ITI manager 110 (FIG. 1) where any element in the infrastructure can be queried to report its ITI for a given policy where the policy is a set of (control id, weight) pairs. Common control ids are defined ahead of time and are therefore known to the system user. The user specifies the desired/required weights. Common practices can be subsequently defined identifying frequently used policies.

The ITI for the underlying infrastructure can be obtained via the one or more APIs 112. The applications or higher level management and orchestration (M&O) stacks then associate the ITI to the respective data sets. With such associations, for example, it can be assured that appropriate data arrays are selected based on their ITI according to the data set policy. As a result, audits can be run against any repository to identify data sets not conforming to the policy. A proper infrastructure subset can be chosen automatically at load time based on the capabilities as required by the ITI associated with the data set.

It is also to be appreciated that these associations can also be supplemented with the veracity scores described in U.S. patent application Ser. No. 14/674,121 filed concurrently herewith and entitled "LINEAGE-BASED VERACITY FOR DATA REPOSITORIES," the disclosure of which is incorporated by reference herein in its entirety.

The ITI is stored as metadata for the data set in a metadata repository, i.e., ITI storage repository 115 (FIG. 1). ITI scores are updated frequently, per business policy, and each update is time stamped. Such ITI metadata can be a key proof point in contractually proving the existence of correct/incorrect data protection levels at any given point of time (audit scenarios). In addition, the ITI metadata helps in ensuring compliance in a dynamic information technology environment where the data is mobile, for example, for tiering or virtual machine migration.

Alarms can also be raised if a new ITI no longer satisfies a data set policy. The software stack can be leveraged, via storage migration, to automatically reposition data sets to different data arrays to satisfy the data set policy. Not only is this measure important for compliance, but it also helps avoid overprovisioning of infrastructure. For example, an entity may be paying too much if the ITI score is more than what is needed for the data sets.

Since the ITI calculation method is generic and does not depend on specific storage product peculiarities, a common dashboard (e.g., graphical displays and/or user interfaces) can be generated which represents ITI compliance in real-time. The dashboard captures ITI score compliance and hence represents the trust health of the infrastructure as well as compliance to current specific regulations or policies. Analysts have the option, through the dashboard, to drill down to the specific infrastructure control that is non-compliant. For example, public cloud presents with unique scenarios, such as cloud-cloud data protection, which can now be valued and weighed according to ITI policies. Hence, a cloud ITI can be generated and compared with an on-premise (private) ITI for different purposes.

FIG. 5A illustrates an ITI dashboard according to an embodiment of the invention. Tables 510 and 520 show an example of a dashboard that presents a user with measures of how a particular set of infrastructures comply with ITI scores associated with various trust dimensions as well as an overall trustworthiness. So as shown in table 510, the particular set of infrastructures is shown to have an ITI score for the trust dimension of security (312 of FIG. 3) that meets a desired/required ITI score 92% of the time, and an ITI score for the trust dimension of availability and recoverability (311 of FIG. 3) that meets a desired/required ITI score 88% of the time, and an overall ITI score (aggregate of ITI scores of all trust dimensions) that meets a desired/required overall ITI score 90% of the time. Assuming that a frequency of compliance of greater than or equal to 90% is the goal (* representing, for example, a green color-coded indicator on the dashboard), while anything lower is considered non-compliant: 80-89% compliance ( representing, for example, a yellow color-coded indicator on the dashboard) and <80% compliance (* representing, for example, a red color-coded indicator on the dashboard), table 510 indicates that the security trust dimension and overall trust dimension are compliant while the availability and recoverability trust dimension is non-compliant. Table 520 (which can, for example, be accessed by the user clicking on the corresponding compliance percentage field of table 510) then illustrates the non-compliant infrastructures in the particular set of infrastructures that are not compliant (e.g., storage array 0010 and storage array 0012) along with the specific domain and control id that do not meet the desired/required ITI value.

For data sets in the cloud (private, public, or hybrid), ITI can be calculated, using the one or more declarative APIs 112 mentioned above with respect to the ITI manager 110 (FIG. 1), separately for public and private portions of an overall set of infrastructures, and for the pipe (network infrastructure) connecting the public and private portions.

Dashboards according to embodiments of the invention can be expanded to include multi-cloud models, as shown in table 530 of FIG. 5B.

For data sets that span private and public boundaries, the ITI can be calculated separately for public and private portions and for the pipe connecting the two portions. A synthetic ITI score can be computed that has a single value representing combined private/pipe/public ITIs. This can be done in a number of ways, for example, but not limited:

Example 1: Use (private, pipe, public) triplet as synthetic index, e.g., if a dataset has a private ITI=123, a pipe ITI=45, and a public ITI=678, then the synthetic ITI=(123, 45, 678).

Example 2: Assume that for a certain enterprise, the ITI for the private portion of all datasets is in the range 0 . . . X, the pipe portion is in the range 0 . . . Y, and public portion in the range 0 . . . Z, then the synthetic ITI is calculated as (private ITI)/X+(pipe ITI)/Y+(public ITI)/Z.

Example 3: Assume that for a certain enterprise, the ITI for the private portion of all datasets is in the range 0 . . . X, the pipe portion in the range 0 . . . Y, and the public portion in the range 0 . . . Z, then the synthetic ITI can be calculated as (private ITI)*Y*Z+(pipe ITI)*Y+(public ITI). For example, assume X=10000, Y=100, Z=1000, then for ITI of (123, 45, 678), the synthetic value is 123*100*1000+45*100+678=12,345,678, that is, we get one number but individual components are still readily identifiable.

Mobility of data sets, through technologies such as vMotion or Live Migration, is very common and a useful use case in an enterprise. However, in these existing solutions, the ability to assess the trust posture of the target infrastructure is still manual or pre-determined. Using the ITI score methodology, the trust posture of the target infrastructure can be assessed before migration actually occurs. A business rule can be set up in the cloud operating system (OS) scheduler to only migrate the VM to the infrastructure with a desired ITI score. Further, since the infrastructure is continuously monitored, the ITI score can be assessed during or immediately post migration, and migration can be rolled back if the ITI score of the target infrastructure is compromised.

Given the illustrative descriptions of embodiments of the ITI methodology, several illustrative use cases will now be described in the context of FIG. 6 through 8. It is to be understood, however, that embodiments of the invention can be implemented in various other uses cases not specifically mentioned here.

Figure 6:
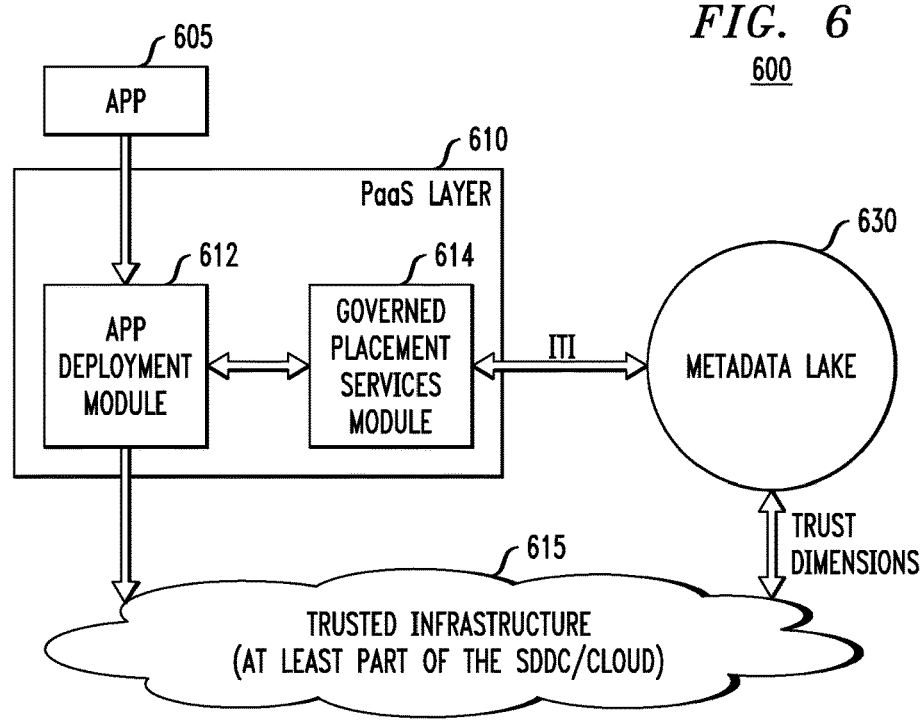
FIG. 6 illustrates trusted placement of applications via an infrastructure trust index, according to an embodiment of the invention.

FIG. 6 illustrates trusted placement of applications via an ITI, according to an embodiment of the invention. It is realized that access can be given to systems or services to extract trust characteristics of the infrastructure to make intelligent trust related decisions. FIG. 6 illustrates an example of this functionality using the governed application placement of U.S. Ser. No. 14/610,191. More particularly, system environment 600 in FIG. 6 shows a Platform as a Service (PaaS) system, such as Cloud Foundry, extracting trust characteristics from metadata lake 630 to make governed decisions regarding the placement of applications. The requirement of the application and the data are used to map to the trust characteristics in the placement decision.

In this particular use case, it is assumed that metadata lake 630 hosts an ITI manager (e.g., 110 of FIG. 1) which is configured to compute an ITI score representative of trust dimensions, as explained above, which are extracted from trusted infrastructure 615. Metadata lake 630 then provides the computed ITI to PaaS layer 610 to be used in making the governed placement decision. Alternatively, the ITI manager may be implemented as part of PaaS layer 610, trusted infrastructure 615 (for each element and/or a set of elements), or separately as a stand-alone component (as will be described in another use case below).

As further shown in FIG. 6, an application 605 is provided to a PaaS layer 610. The application developer seeks to have application 605 deployed on trusted infrastructure due to some trust-based criteria such as policy, requirement, regulation, or the like, associated with the application. Existing PaaS tools are not typically able to take into account such trust-based criteria or identify which cloud infrastructure would be able to best satisfy such criteria, nor map the two pieces of information to one another.

In accordance with one embodiment, PaaS layer 610, in conjunction with metadata lake 630, is configured to determine a deployment for application 605 on a trusted infrastructure within the cloud infrastructure environment based on at least a subset of the metadata maintained in the metadata lake (i.e., in this use case, the ITI computed for the trusted infrastructure). This is accomplished with application deployment module 612 and governed placement services module 614. More particularly, a request to deploy application 605 is presented to application deployment module 612. Application deployment module 612 calls governed placement services module 614 which determines the deployment of application 605 based on the ITI score for the trusted infrastructure 615. If the ITI score satisfies trust-based criteria (e.g., policies, requirements, regulations, etc.) associated with application 605, then governed placement module 614 makes the decision to recommend placement of the application.

Once a placement decision is made by governed placement services module 614, module 614 notifies application deployment module 612 which, in turn, deploys the application on the identified trusted infrastructure 615. The metadata lake 630 is also notified of the placement decision by module 614. Metadata lake 630 stores this information which serves as an audit trail for subsequent query services.

Governance, risk, and compliance (GRC) tools, such as RSA Archer, can also be configured to extract ITI scores to perform tasks such as risk management and compliance management.

Furthermore, custom policies can be created using a trust API as part of ITI manager 110 (FIG. 1), for example, "EncryptionKeySize" policy can be created using the HyperText Transport Protocol (HTTP) PUT request: PUT https://${publicURL}/ti/policy/EncyptionKeySize, where weights are provided as parameters. Policies can be updated via the HTTP POST request using the same uniform resource locator (URL), and retrieved via the HTTP GET request. ITI for every element in a trusted infrastructure (TI) can be obtained via the HTTP GET request: GET https://${publicURL}/ti/iti, where element(s) and policy are specified via request parameters, e.g., policy="EncryptionKeySize", node="VMAX1234". Similarly, ITI for any dataset can be obtained using the same HTTP GET request but specifying dataset parameter instead of element, e.g., policy="EncryptionKeySize", dataset="data1234".

Figure 7:
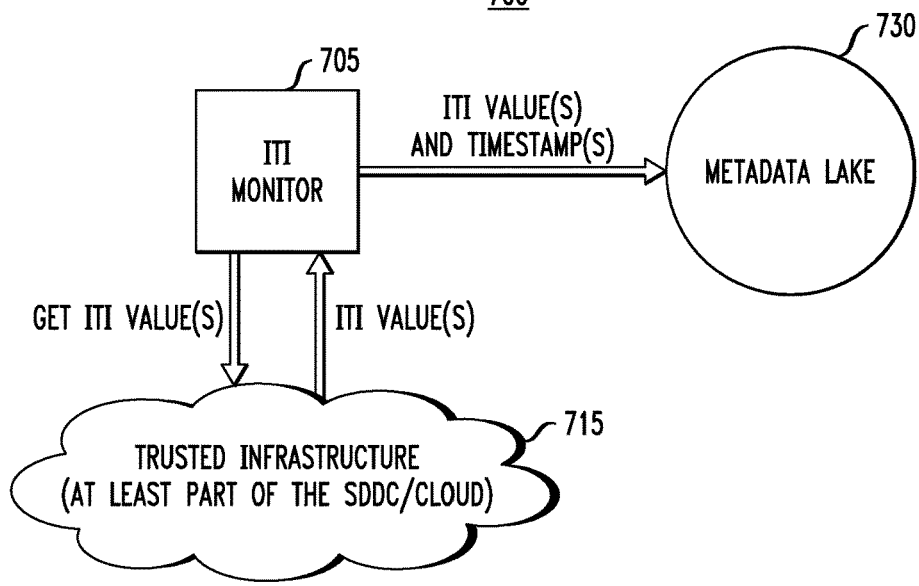
FIG. 7 illustrates an infrastructure trust index monitor, according to an embodiment of the invention.

FIG. 7 illustrates an ITI monitor, according to an embodiment of the invention. As shown in system 700, ITI monitor 705 can make periodic queries to trusted infrastructure 715 and store results in metadata lake 730 creating audit trail. ITI monitor can use an API as described above to run the query and store returned ITI together with timestamp for per-policy audit trail. It is assumed in this use case that the trusted infrastructure 715 is configured to compute ITI scores for each element (or some subset of elements) of the infrastructure. That is, for example, the ITI computation part of an ITI manager 110 is part of the trusted infrastructure, while the querying and reporting part of the ITI manager 110 is implemented by ITI monitor 705.

Figure 8:
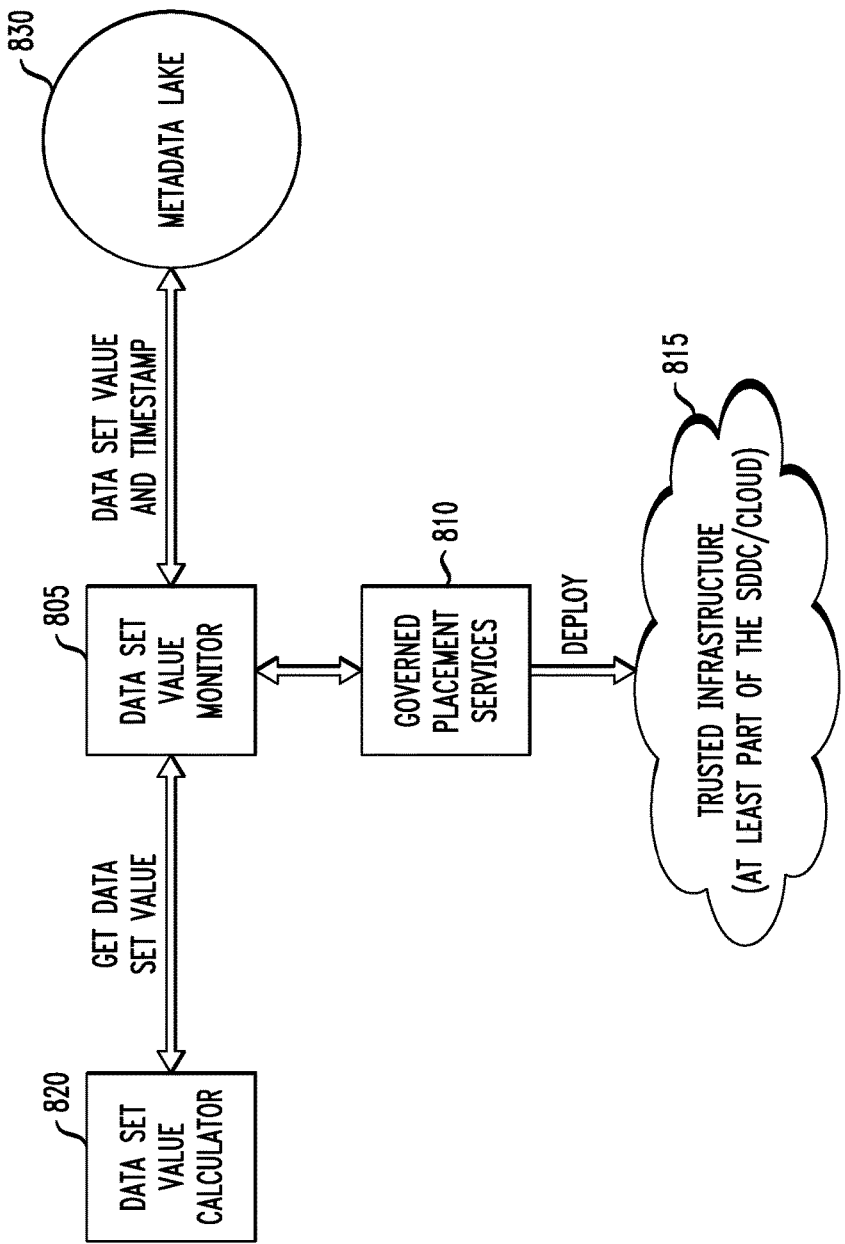
FIG. 8 illustrates a data set value monitor, according to an embodiment of the invention.

FIG. 8 illustrates a data set value monitor, according to an embodiment of the invention. As mentioned above, data sets have value to organizations and, in fact, are insurable against breach, theft, corruption and/or loss. However, data set value changes with time: as data becomes outdated its value decreases, on the other hand new data can be added thus increasing value of the whole data set, etc. Data set value monitor 805 in system 800 can run periodic queries and reposition data sets according to their current value. As shown, data set value calculator 820 (in one example, a GRC module) provides the data set monitor 805 with a measure representative of the current value of the subject data set. One example of the calculated value is a value rating selected from 1 through 10; however, one ordinarily skilled in the art will realize various other measures given the teachings provided herein.

This data set value and timestamp is provided to metadata lake 830 for storage. The timestamp can be provided by the calculator 820 or the monitor 805. The data set monitor 805 calls governed placement services (GPS) module 810. At this point, GPS module 810 takes the current value of the data set and compares it to the previous value of the data set when it was last deployed to a new infrastructure. If the value has changed, then the GPS module 810 records this occurrence.

In addition, the GPS module 810 can determine the current ITI for that data set, either by querying the specific elements of cloud 815, or going to the metadata lake 830 and asking "what was your last ITI for the infrastructure hosting that data set?" The GPS module 810 also can retrieve the historical ITI for the infrastructure when the data set was deployed onto it.

Now data value monitor 805 has four pieces of data: historical ITI at last placement; current ITI; historical data value at last placement; and current data value.

If any of these values are inconsistent (e.g., current value of the data set is not equal to the past value of the data set, and/or the current ITI is not equal to the past ITI), this is a signal to the GPS module 810 that it needs to reassess the current placement, so the GPS module 810 then runs through its placement algorithm again to determine if it can come up with a better match. If the GPS module 810 does, it can either: (a) automatically move the data; or (b) notify someone or some system that a move is required. By way of example, the move may be to reposition/migrate the subject data set to another storage device or element in trusted infrastructure 815 (or some other infrastructure altogether).

Figure 9:
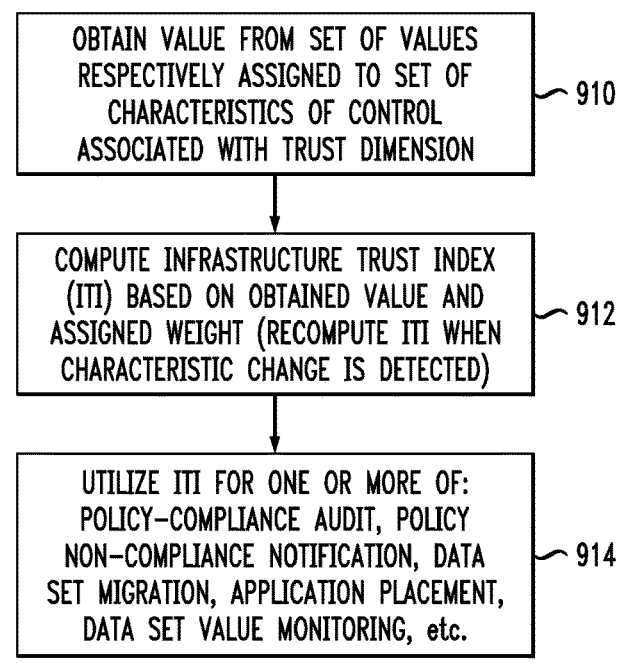
FIG. 9 illustrates a methodology for computing and utilizing an infrastructure trust index, according to an embodiment of the invention.

FIG. 9 illustrates a methodology 900 for computing an infrastructure trust index, according to an embodiment of the invention.

As shown in step 910, a value is obtained from a set of values respectively assigned to a set of characteristics of a control associated with at least one trust dimension attributable to a given storage infrastructure. The given storage infrastructure comprises one or more storage elements (e.g., disk arrays, etc.).

In step 912, an infrastructure trust index (ITI) is computed based at least on the obtained value and an assigned weight, wherein the infrastructure trust index characterizes a trustworthiness attributable to the given storage infrastructure. Non-limiting examples of such values, characteristics, controls, weights, and trust dimensions are described above in the context of FIGS. 4A and 4B.

The ITI is used, in step 914, for one or more of: a policy-compliance audit, policy non-compliance notification, a data set migration decision, an application placement decision, data set value monitoring, etc.

Figure 10:
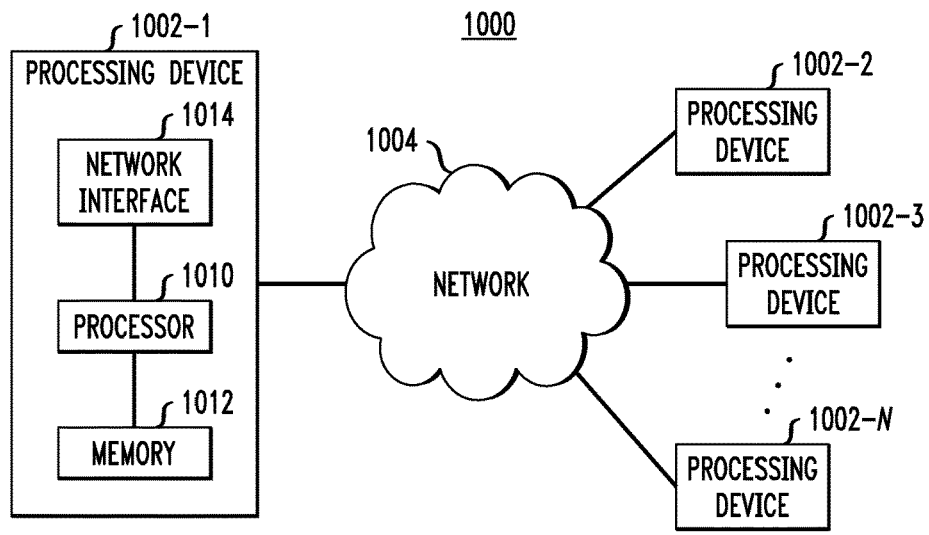
FIG. 10 illustrates a processing platform used to implement an infrastructure trust index manager and cloud infrastructure environment, according to an embodiment of the invention.

As an example of a processing platform on which an ITI manager and cloud infrastructure environment (e.g., 100 of FIG. 1) can be implemented is processing platform 1000 shown in FIG. 10. The processing platform 1000 in this embodiment comprises a plurality of processing devices, denoted 1002-1, 1002-2, 1002-3, . . . 1002-N, which communicate with one another over a network 1004. It is to be appreciated that the ITI methodologies described herein may be executed in one such processing device 1002, or executed in a distributed manner across two or more such processing devices 1002. The cloud infrastructure environment may also be executed in a distributed manner across two or more such processing devices 1002. The various functionalities described herein may be executed on the same processing devices, separate processing devices, or some combination of separate and the same (overlapping) processing devices. It is to be further appreciated that a server, a client device, a computing device or any other processing platform element may be viewed as an example of what is more generally referred to herein as a "processing device." As illustrated in FIG. 10, such a device generally comprises at least one processor and an associated memory, and implements one or more functional modules for instantiating and/or controlling features of systems and methodologies described herein. Multiple elements or modules may be implemented by a single processing device in a given embodiment.

The processing device 1002-1 in the processing platform 1000 comprises a processor 1010 coupled to a memory 1012. The processor 1010 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 1010. Memory 1012 (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 1012 may comprise electronic memory such as random access memory (RAM), read-only memory (ROM) or other types of memory, in any combination. The one or more software programs when executed by a processing device such as the processing device 1002-1 causes the device to perform functions associated with one or more of the components/steps of system/methodologies in FIGS. 1-9. One skilled in the art would be readily able to implement such software given the teachings provided herein. Other examples of processor-readable storage media embodying embodiments of the invention may include, for example, optical or magnetic disks.

Processing device 1002-1 also includes network interface circuitry 1014, which is used to interface the device with the network 1004 and other system components. Such circuitry may comprise conventional transceivers of a type well known in the art.

The other processing devices 1002 (1002-2, 1002-3, . . . 1002-N) of the processing platform 1000 are assumed to be configured in a manner similar to that shown for computing device 1002-1 in the figure.

The processing platform 1000 shown in FIG. 10 may comprise additional known components such as batch processing systems, parallel processing systems, physical machines, virtual machines, virtual switches, storage volumes, etc. Again, the particular processing platform shown in this figure is presented by way of example only, and the ITI manager and cloud infrastructure environment collectively shown as 100 in FIG. 1 may include additional or alternative processing platforms, as well as numerous distinct processing platforms in any combination.

Also, numerous other arrangements of servers, clients, computers, storage devices or other components are possible in processing platform 1000. Such components can communicate with other elements of the processing platform 1000 over any type of network, such as a wide area network (WAN), a local area network (LAN), a satellite network, a telephone or cable network, or various portions or combinations of these and other types of networks.

Furthermore, it is to be appreciated that the processing platform 1000 of FIG. 10 can comprise virtual machines (VMs) implemented using a hypervisor. A hypervisor is an example of what is more generally referred to herein as "virtualization infrastructure." The hypervisor runs on physical infrastructure. As such, the techniques illustratively described herein can be provided in accordance with one or more cloud services. The cloud services thus run on respective ones of the virtual machines under the control of the hypervisor. Processing platform 1000 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

An example of a commercially available hypervisor platform that may be used to implement portions of the processing platform 1000 in one or more embodiments of the invention is the VMware vSphere (VMware Inc. of Palo Alto, Calif.) which may have an associated virtual infrastructure management system such as the VMware vCenter. The underlying physical infrastructure may comprise one or more distributed processing platforms that include storage products such as VNX and Symmetrix VMAX (both available from EMC Corporation of Hopkinton, Mass.). A variety of other computing and storage products may be utilized to implement the one or more cloud services that provide the functionality and features described herein.

It was noted above that portions of the system environment 100 may be implemented using one or more processing platforms. A given such processing platform comprises at least one processing device comprising a processor coupled to a memory, and the processing device may be implemented at least in part utilizing one or more virtual machines, containers or other virtualization infrastructure. By way of example, such containers may be Docker containers or other types of containers.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising:
    obtaining a value from a set of values respectively assigned to a set of characteristics of a first control associated with at least one trust dimension attributable to a given infrastructure, wherein the given infrastructure comprises elements comprising a computing component, a storage component and a network component, and wherein the trust dimension for which the value is obtained from taxonomy dimensions attributable to the given infrastructure respectively representing availability, security, sustainability, transparency, serviceability, and manageability of the given infrastructure such that the obtained value specifically corresponds to a given characteristic of a given first control of the selected dimension;
    computing one or more infrastructure trust indexes characterizing a trustworthiness attributable the one or more elements of the given infrastructure based at least on the obtained value, wherein computing the one or more infrastructure trust indexes further comprises obtaining a value from a set of values respectively assigned to a set of characteristics of a second control associated with the trust dimension attributable to the given infrastructure, and aggregating the value obtained for the first control and the value obtained for the second control, and further wherein a separate infrastructure trust index is computed for each of the elements of the infrastructure;
    directing a query to one or more of the elements in the given infrastructure to obtain the respective infrastructure trust index for each of the queried one or more elements;

wherein the given infrastructure comprises a first portion, at least a second portion, and a network portion connecting the first portion and the second portion, and wherein the one or more computed infrastructure trust indexes represent an aggregation of respective contributions for the first portion, the second portion, and the network portion connecting the first portion and the second portion; and performing one or more functions utilizing at least one of the one or more computed infrastructure trust indexes;

wherein performing the one or more functions comprises one or more of:

generating a placement decision for an application based on the at least one utilized infrastructure trust index, and causing deployment of the application within the given infrastructure in accordance with the placement decision; and generating a migration decision for a data set based on at least one of the one or more computed infrastructure trust indexes and a measure of value calculated for a data set stored on the given infrastructure, and causing migration of the data set in accordance with the migration decision; and wherein the steps of the method are performed by at least one processing device comprising a processor operatively coupled to a memory.

2. The method of claim 1, wherein computing the one or more infrastructure trust indexes further comprises applying a first weight factor to the obtained value for the first control and a second weight factor to the obtained value for the second control prior to aggregating the values.

3. The method of claim 2, wherein the first and second weight factors associated with the first and second controls are specified in accordance with a given trust policy.

4. The method of claim 1, wherein the one or more infrastructure trust indexes are computed based on values obtained for multiple trust dimensions attributable to the given infrastructure.

5. The method of claim 1, wherein the query is directed via a common application programming interface.

6. The method of claim 1, further comprising associating the infrastructure trust index computed for the given infrastructure with a data set stored on the infrastructure.

7. The method of claim 1, further comprising:

monitoring for a change to a characteristic of the first control associated with the at least one trust dimension; and recomputing the infrastructure trust index when the characteristic of the first control associated with the at least one trust dimension changes.

8. The method of claim 7, further comprising maintaining a record of infrastructure trust indexes for the given infrastructure.

9. The method of claim 1, further comprising issuing a notification when the infrastructure trust index deviates from a trust policy-compliant index range.

10. The method of claim 9, further comprising maintaining a graphical user interface that presents trust policy-compliance data associated with the given infrastructure.

11. The method of claim 10, wherein the graphical user interface is configured to present which of the one or more elements of the given infrastructure is not trust policy-compliant.

12. A system comprising:

one or more processors operatively coupled to one or more memories configured to:

obtain a value from a set of values respectively assigned to a set of characteristics of a first control associated with at least one trust dimension attributable to a given infrastructure, wherein the given infrastructure comprises elements comprising a computing component, a storage component and a network component, and wherein the trust dimension for which the value is obtained from taxonomy dimensions attributable to the given infrastructure respectively representing availability, security, sustainability, transparency, serviceability, and manageability of the given infrastructure such that the obtained value specifically corresponds to a given characteristic of a given first control of the selected dimension;

compute one or more infrastructure trust indexes characterizing a trustworthiness attributable the one or more elements of the given infrastructure based at least on the obtained value, wherein computing the one or more infrastructure trust indexes further comprises obtaining a value from a set of values respectively assigned to a set of characteristics of a second control associated with the trust dimension attributable to the given infrastructure, and aggregating the value obtained for the first control and the value obtained for the second control, and further wherein a separate infrastructure trust index is computed for each of the elements of the infrastructure;

direct a query to one or more of the elements in the given infrastructure to obtain the respective infrastructure trust index for each of the queried one or more elements;

wherein the given infrastructure comprises a first portion, at least a second portion, and a network portion connecting the first portion and the second portion, and wherein the one or more computed infrastructure trust indexes represent an aggregation of respective contributions for the first portion, the second portion, and the network portion connecting the first portion and the second portion; and perform one or more functions utilizing at least one of the one or more computed infrastructure trust indexes;

wherein, in performing the one or more functions, the one or more processors are configured to one or more of:

generate a placement decision for an application based on the at least one utilized infrastructure trust index, and cause deployment of the application within the given infrastructure in accordance with the placement decision; and generate a migration decision for a data set based on at least one of the one or more computed infrastructure trust indexes and a measure of value calculated for a data set stored on the given infrastructure, and cause migration of the data set in accordance with the migration decision.

13. An article of manufacture comprising a processor-readable storage medium having encoded therein executable code of one or more software programs, wherein the one or more software programs when executed by one or more processing devices implement steps of:

obtaining a value from a set of values respectively assigned to a set of characteristics of a first control associated with at least one trust dimension attributable to a given infrastructure, wherein the given infrastructure comprises elements comprising a computing component, a storage component and a network component, and wherein the trust dimension for which the value is obtained from taxonomy dimensions attributable to the given infrastructure respectively representing availability, security, sustainability, transparency, serviceability, and manageability of the given infrastructure such that the obtained value specifically corresponds to a given characteristic of a given first control of the selected dimension;

computing one or more infrastructure trust indexes characterizing a trustworthiness attributable the one or more elements of the given infrastructure based at least on the obtained value, wherein computing the one or more infrastructure trust indexes further comprises obtaining a value from a set of values respectively assigned to a set of characteristics of a second control associated with the trust dimension attributable to the given infrastructure, and aggregating the value obtained for the first control and the value obtained for the second control, and further wherein a separate infrastructure trust index is computed for each of the elements of the infrastructure;

directing a query to one or more of the elements in the given infrastructure to obtain the respective infrastructure trust index for each of the queried one or more elements;

wherein the given infrastructure comprises a first portion, at least a second portion, and a network portion connecting the first portion and the second portion, and wherein the one or more computed infrastructure trust indexes represent an aggregation of respective contributions for the first portion, the second portion, and the network portion connecting the first portion and the second portion; and performing one or more functions utilizing at least one of the one or more computed infrastructure trust indexes;

wherein performing the one or more functions comprises one or more of:

generating a placement decision for an application based on the at least one utilized infrastructure trust index, and causing deployment of the application within the given infrastructure in accordance with the placement decision; and generating a migration decision for a data set based on at least one of the one or more computed infrastructure trust indexes and a measure of value calculated for a data set stored on the given infrastructure, and causing migration of the data set in accordance with the migration decision.

14. The article of claim 13, wherein computing the one or more infrastructure trust indexes further comprises applying a first weight factor to the obtained value for the first control and a second weight factor to the obtained value for the second control prior to aggregating the values and wherein the first and second weight factors associated with the first and second controls are specified in accordance with a given trust policy.

15. The method of claim 1, wherein first portion of the given infrastructure is a private infrastructure portion and the second portion of the given infrastructure is a public infrastructure portion.

16. The system of claim 12, wherein computing the one or more infrastructure trust indexes further comprises applying a first weight factor to the obtained value for the first control and a second weight factor to the obtained value for the second control prior to aggregating the values and wherein the first and second weight factors associated with the first and second controls are specified in accordance with a given trust policy.

17. The system of claim 12, wherein first portion of the given infrastructure is a private infrastructure portion and the second portion of the given infrastructure is a public infrastructure portion.

18. The system of claim 12, further comprising associating the infrastructure trust index computed for the given infrastructure with a data set stored on the infrastructure.

19. The article of claim 13, wherein first portion of the given infrastructure is a private infrastructure portion and the second portion of the given infrastructure is a public infrastructure portion.

20. The article of claim 13, further comprising associating the infrastructure trust index computed for the given infrastructure with a data set stored on the infrastructure.

* * * * *